US008696826B2

(12) United States Patent
Jickling et al.

(10) Patent No.: US 8,696,826 B2
(45) Date of Patent: Apr. 15, 2014

(54) ELECTRODE WASHING METHOD AND SYSTEM

(75) Inventors: Robert Stanley Jickling, Georgetown (CA); Gordon Steven Iverson, Oakville (CA)

(73) Assignee: EPCM Services Ltd., Oakville (CA)

( * ) Notice: Subject to any disclaimer, the term of this patent is extended or adjusted under 35 U.S.C. 154(b) by 764 days.

(21) Appl. No.: 12/559,845

(22) Filed: Sep. 15, 2009

(65) Prior Publication Data

US 2010/0065089 A1 Mar. 18, 2010

Related U.S. Application Data

(60) Provisional application No. 61/097,067, filed on Sep. 15, 2008.

(51) Int. Cl.
*C03C 23/00* (2006.01)

(52) U.S. Cl.
USPC ................................ 134/32; 134/2; 134/25.1

(58) Field of Classification Search
None
See application file for complete search history.

(56) References Cited

U.S. PATENT DOCUMENTS

| | | | | |
|---|---|---|---|---|
| 4,014,445 | A | 3/1977 | Hirata et al. | |
| 4,148,108 | A | 4/1979 | Kamata et al. | |
| 4,148,706 | A * | 4/1979 | Ohiwa et al. | 204/245 |
| 4,445,281 | A * | 5/1984 | Aigoo | 34/58 |
| 4,566,951 | A | 1/1986 | Norberg et al. | |
| 5,567,285 | A | 10/1996 | Sitges Menendez et al. | |
| 2007/0151580 | A1 | 7/2007 | Salamanca | |

FOREIGN PATENT DOCUMENTS

| | | | |
|---|---|---|---|
| CA | 1184878 | A | 4/1985 |
| CA | 2507379 | A1 | 6/2004 |
| EP | 2031097 | A1 | 3/2009 |
| JP | 63262494 | A * | 10/1988 |
| WO | 2006020022 | A2 | 2/2006 |
| WO | 2006020078 | A2 | 2/2006 |

OTHER PUBLICATIONS

International Search Report issued Dec. 11, 2009 in respect of corresponding International Publication No. WO/2010/028498.

* cited by examiner

*Primary Examiner* — Eric Golightly
(74) *Attorney, Agent, or Firm* — Bereskin & Parr LLP/S.E.N.C.R.L., s.r.l.

(57) ABSTRACT

Electrodes are conveyed edgewise along a path. The electrodes can be supported by their bottom peripheral edge and can be maintained generally vertically. A plurality of wash nozzles are positioned adjacent to the path on opposing sides thereof. Wash spray from the nozzles is directed to impinge sides of the electrode. The nozzles can be arranged linearly to form a nozzle array angled so that the wash spray impinges an upper portion prior to a bottom portion of the electrode. Separate sections for rinsing or pre-washing can be provided within a washing chamber. Used water can be collected and recycled.

12 Claims, 15 Drawing Sheets

ELECTRODE WASHING METHOD AND SYSTEM

CROSS REFERENCE TO RELATED APPLICATIONS

This application claims the benefit of U.S. Provisional Application No. 61/097,067 filed Sep. 15, 2008, which is hereby incorporated by reference in its entirety.

FIELD

This specification relates generally to methods and systems for washing electrodes typically used in the refining or winning of metals.

BACKGROUND

The following paragraphs are not an admission that anything discussed in them is prior art or part of the knowledge of persons skilled in the art.

U.S. Pat. No. 4,566,951 (Norberg et al.) discloses a method for cleaning cathode and/or anode plates which are obtained in the electrolytic refining of metals and which are lifted in groups suspended on bars or lugs from the electrolytic bath and thereafter the plates are washed by passing in succession through the washing operation.

U.S. Pat. No. 5,567,285 (Sitges Menendez et al.) discloses a facility for removing electro-deposited layers from cathodes, including a cathode reception area, a cathode treatment area with a cathode washing apparatus and an extraction apparatus, and a storage area to store cathodes which have had electro-deposited layers removed.

United States Patent Publication No. 20070151580 (Salamanca) discloses a robot system and method for cathode washing in industrial and electrometallurgical processes.

INTRODUCTION

In an aspect of this specification, a method of washing an electrode, the electrode including first and second sides and peripheral edges, can comprise: providing a plurality of wash nozzles adjacent to a path at opposing sides thereof; conveying the electrode edgewise along the path; and directing wash sprays from the nozzles to impinge the first and second sides of the electrode as the electrode is conveyed along the path.

The electrodes can be conveyed by supporting a bottom peripheral edge. The method can further comprise guiding the electrode as the electrode is conveyed along the path to maintain the electrode generally vertically. The wash spray can be directed generally perpendicularly to the path. Two or more of the plurality of wash nozzles can direct the wash spray substantially vertically across the entire first side of the electrode. The wash spray can impinge an upper portion of the first side prior to a bottom portion of the first side as the electrode is conveyed along the path.

The method can further comprise: substantially enclosing a washing section; and providing a mechanism for sealing an entrance and exit at which the electrode is allowed to pass edgewise respectively into and out of the washing section. The method can further comprise maintaining the washing section at negative pressure relative to an ambient pressure.

The method can further comprise: providing at least one rinse nozzle adjacent to the path downstream from the wash nozzles; and directing a rinse spray from the at least one rinse nozzle to rinse the electrode as the electrode is conveyed along the path.

The method can further comprise substantially separately enclosing a washing section associated with the wash spray and a rinsing section associated with the rinse spray. The method can further comprise maintaining the washing and rinsing sections at negative pressure relative to an ambient pressure.

The method can further comprise: collecting waste rinse water from below the at least one rinse nozzle; and providing at least a portion of the waste rinse water to the wash nozzles for the wash spray.

The method can further comprise: providing at least one pre-wash nozzle adjacent to the path upstream from the wash nozzles, the pre-wash nozzle connected to a source of heated water; and directing a pre-wash spray from the at least one pre-wash nozzle onto the electrode to wet the electrode and increase the electrode's temperature above an ambient temperature prior to washing.

The method can further comprise: collecting waste water from below the wash nozzles; and providing at least a portion of the waste water to the at least one pre-wash nozzle for the pre-wash spray.

The method can further comprise subjecting the electrode to an airflow to dry the electrode.

In an aspect of this specification, a method of washing an electrode can comprise: conveying the electrode edgewise along a path; providing at least one wash nozzle adjacent to the path; directing a wash spray from the wash nozzle onto the electrode as the electrode is conveyed along the path to wash the electrode; providing at least one rinse nozzle adjacent to the path; and directing a rinse spray from the wash nozzle onto the electrode as the electrode is conveyed along the path to rinse the electrode.

The method can further comprise collecting at least a portion of the rinse spray water for use in the wash spray. The method can further comprise, prior to the step of conveying: providing at least one pre-wash nozzle adjacent to the path, the pre-wash nozzle connected to a source of heated water; and directing a pre-wash spray from the pre-wash nozzle onto the electrode to wet the electrode and increase the electrode's temperature prior to washing. The method can further comprise collecting at least a portion of the wash spray water for use in the pre-wash spray. The method can further comprise, subsequent to step of directing a rinse spray, subjecting the electrode to an airflow to dry the electrode.

In an aspect of this specification, a system for washing electrodes, each of the electrodes including first and second sides and peripheral edges, can comprise: a conveyor for conveying the electrodes edgewise along a path; and a plurality of wash nozzles positioned adjacent to the path on opposing sides thereof, the wash nozzles directed towards the path for impinging the electrodes as the electrodes are conveyed along the path.

The conveyor can include a conveyor belt for supporting a bottom peripheral edge of each electrode. The conveyor belt can include at least one support cleat for supporting the bottom peripheral edge of each electrode and maintaining the electrode generally above the conveyor belt. The conveyor belt can include at least one safety stop for engaging a rear peripheral edge of the electrode to urge the electrode along the path.

The system can further comprise a plurality of guide rails arranged laterally on both sides of the path. The guide rails can maintain the electrodes generally vertically as the electrodes are conveyed along the path.

The wash nozzles can each be directed generally perpendicularly to the path. Two or more of the plurality of wash nozzles can be arranged linearly to form a nozzle array. The nozzle array can be adapted to direct the wash spray substantially vertically across the entire first side of the electrode. The nozzle array can be angled so that the wash spray impinges an upper portion of the first side prior to a bottom portion of the first side as the electrode is conveyed along the path.

The system can further comprise an enclosure for enclosing a washing section associated with the wash nozzles. The enclosure can include an entrance and exit having sealing mechanism.

The system can further comprise at least one rinse nozzle positioned adjacent to the path. The at least one rinse nozzle can be directed towards the path for rinsing the electrodes as the electrodes are conveyed along the path downstream from the wash nozzles.

The system can further comprise an enclosure substantially separately enclosing a washing section associated with the at least one wash nozzle and a rinsing section associated with the at least one rinse nozzle. The washing and rinsing sections can be separated by a partitioning wall.

The system can further comprise a rinse reservoir located beneath the at least one rinse nozzle. The rinse reservoir connected to the wash nozzles to provide waste rinse water to the wash nozzles.

The system can further comprise at least one pre-wash nozzle positioned adjacent to the path. The at least one pre-wash nozzle can be directed towards the path for wetting the electrodes as the electrodes are conveyed along the path downstream from the wash nozzles. The at least pre-wash nozzle can be connected to a source of heated water such that the pre-wash spray increases electrode temperature above an ambient temperature prior to washing.

The system can further comprise a wash reservoir located beneath the wash nozzles. The wash reservoir can be connected to the pre-wash nozzles to provide at least a portion of the waste wash water to the pre-wash nozzles for the pre-wash spray.

The system can further comprise an exhaust system adapted to maintain the space within the enclosure at negative pressure relative to an ambient pressure.

The system can further comprise a drying system located at an exit of the enclosure for drying the electrodes. The drying system can include a pair of plenums extending generally vertically on opposing sides of the path of the electrode. Each of the plenums can include vertically extending longitudinal slots for drawing air along side surfaces of the electrode. The plenums can be connected to the exhaust system for venting the air. The drying system can also include an elongate passage sized to allow the electrode to be conveyed edgewise therebetween. The drying system can further include a sealing mechanism for minimizing airflow around the electrode thereby maintaining the enclosure roughly sealed relative to the drying system.

In combination, two of the systems as described above can be aligned in parallel for washing separate lines of electrodes.

These and other features of the applicant's teachings are set forth herein.

DRAWINGS

For a better understanding of the present invention and to show more clearly how it may be carried into effect, reference will now be made, by way of example, to the accompanying drawings in which.

DESCRIPTION OF VARIOUS EMBODIMENTS

Figure 1:
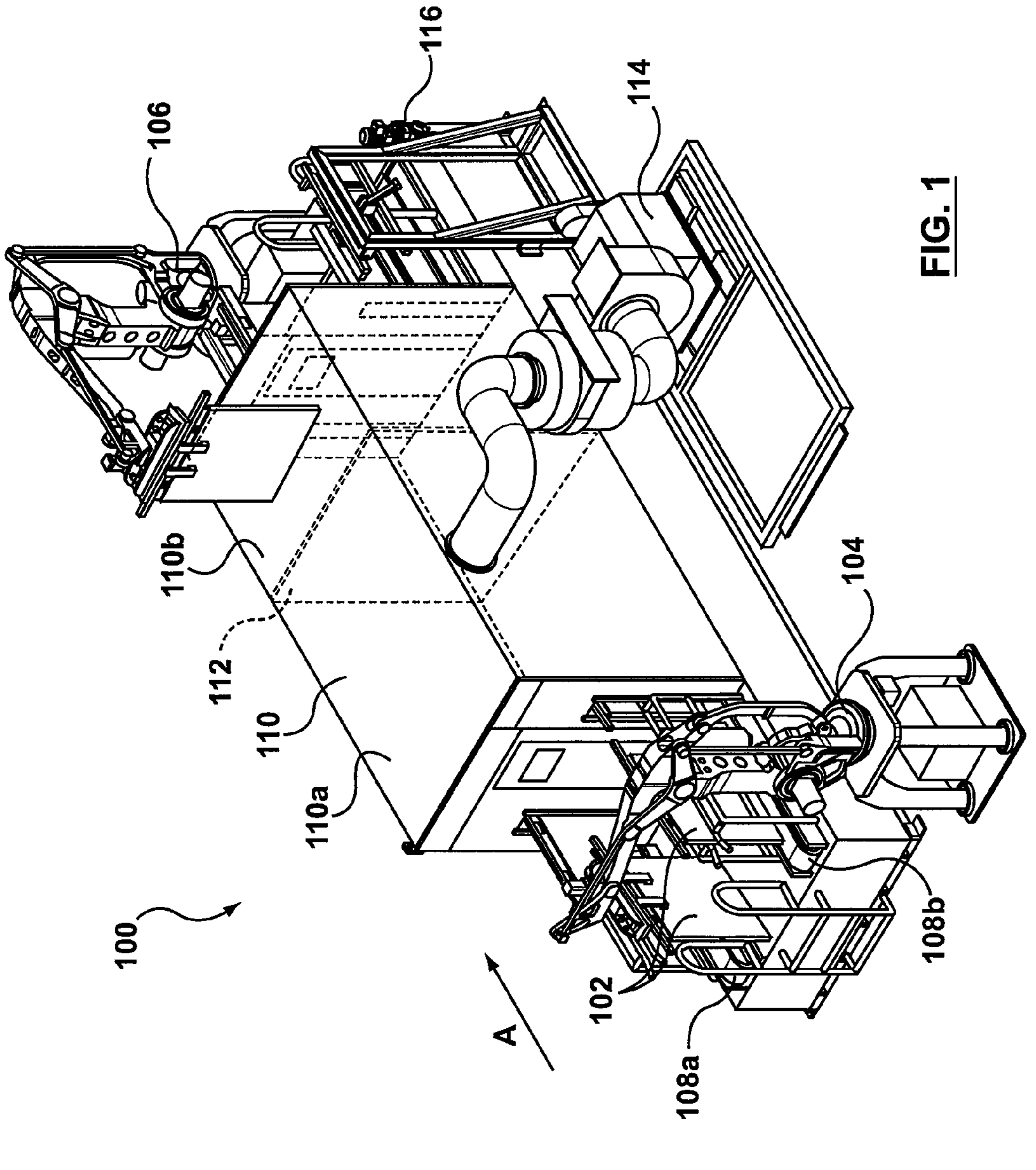
FIG. 1 is a perspective view of an electrode washing system.

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. The applicants, inventors or owners reserve all rights that they may have in any invention disclosed in an apparatus or process described below that is not claimed in this document, for example the right to claim such an invention in a continuing application and do not intend to abandon, disclaim or dedicate to the public any such invention by its disclosure in this document.

Electro-refining of metals typically involves placing an anode made from the crude metal to be refined and a cathode together in a suitable electrolytic bath. Application of a voltage between the anode and the cathode causes the crude metal to oxidize and pure metal ions to go into solution and to migrate electrolytically through the electrolytic bath towards the cathode. The pure metal ions are deposited onto the cathode as a refined metal, usually of very high purity. The majority of the impurities are left behind in the electrolytic bath.

Electro-winning of metals typically involves placing an anode made from a metal that is different from the metal to be refined and a cathode together in a suitable electrolytic bath. The metal to be refined is added to the electrolytic bath in a soluble form (e.g., prepared from a leaching and solvent extraction process). Application of a voltage between the anode and cathode causes the metal to migrate from the solution and deposit onto the cathode as a refined metal of high purity.

Generally similar electrolytic cell arrangements are used for electro-winning and electro-refining. For electro-winning, a solution is provided which the desired metal, e.g., copper, is in a solution. Electrolysis is then used to cause the copper or the desired metal to deposit on the cathodes. In electro-refining, metal already recovered, e.g., again copper, is provided as the anode, and by way of electrolysis is caused to go into solution and then deposit on the cathodes; the electro-refining operation has conditions set to encourage deposition of the desired copper on the cathodes, while leaving other undesired metals and other materials in solution, or otherwise not deposited on the cathodes. In either case, after a suitable thickness of refined metal has been deposited onto the surface of the cathode, the cathode is removed from the electrolytic bath. For permanent cathodes, the deposited layer can then be separated in a subsequent stripping step.

Residual contaminant materials from the electrolytic bath can remain on the cathode surfaces once the cathodes are removed from the electrolytic bath. These surface impurities can include, for example but not limited to, organic material or inorganic salts and compounds of the metal and impurities. The surface impurities can dry on the cathode and significantly degrade the purity and corresponding value of the copper deposit product. For example, the presence of surface impurities such as "bluestone" (copper sulfate) can cause the sulphur level of the copper deposit product to be higher than acceptable levels for "A" grade. It is therefore desirable to wash the cathode after removal from the electrolytic bath to remove or at least reduce the presence of surface impurities.

Applicant's teachings relate to a method of and a system for washing electrodes. The electrodes can be, for example but not limited to, cathodes. The cathodes can be conveyed edgewise along a path. Wash nozzles can be provided adjacent to the path, and can direct a wash spray to impinge surfaces of the cathode. One or more washing sections can be provided, and optional rinsing or pre-wash sections can be included. The method and system can achieve superior wash quality.

Referring to FIG. 1, an electrode washing system is shown generally at 100.

As illustrated in the drawings, the system 100 is shown in use with a plurality of cathodes 102. The cathodes 102 can take the form of a typical permanent cathode assembly including a generally planar deposition plate having first and second sides and defining peripheral edges. The deposition plate can be manufactured from an electrically conductive material having a relatively high tensile strength and good corrosion resistance. For example, the deposition plate may be formed from 316L stainless steel or other alloys with acceptable anti-corrosion properties and with a "2B" finish. Each cathode 102 may also include an electrically conductive hanger bar that is electrically coupled to the deposition plate. For example, the hanger bar may be formed from copper. The hanger bar supports the deposition plate within the electrolytic bath and provides a path for the flow of electricity between the power source and the deposition plate. Other electrode configurations are possible and compatible with the washing system 100, and the applicant does not intend to limit the present teaching to the particular cathode 102 illustrated.

The cathodes 102 can be introduced to the system 100 using an in-feed robot 104. The cathodes 102 can be supplied to the in-feed robot 104 by a conveyor or stationary rack (not shown). The cathodes 102 can be exited from the system 100 using an out-feed robot 106. The robots 104, 106 can be configured to rotate and position each cathode 102 as desired. The robots 104, 106 can be an off-the-shelf model, for example but not limited to, a FANUC™ M-4101B Series robot (FANUC Robotics Canada Ltd. of Mississauga, Ontario, Canada).

Although robots 104, 106 are illustrated, any other suitable means can be implemented for loading or unloading the cathodes 102 to the system 100. The robots 104, 106 are attractive for manipulation of the cathodes 102 because they can enable accurate pickup and placement of the cathodes 102, which can be of substantial mass.

The system 100 includes at least one conveyor 108 for conveying each of the cathodes 102 edgewise in a single file path in a direction A. The at least one conveyor 108 conveys each of the cathodes 102 edgewise through a washing chamber 110. Sides of each of the cathodes 102 can be maintained generally parallel with the direction A as each cathode 102 is conveyed along the path. Each cathode 102 can also be maintained generally vertically as each cathode 102 is conveyed along the path.

As illustrated, in some examples, the in-feed robot 104 places the cathodes 102 onto the two conveyor lines 108*a*, 108*b*. Use of a plurality of conveyor lines 108 provides multiple wash lines to increase the output capacity of the system 100. The conveyor lines 108*a*, 108*b* run generally in parallel between the robots 104, 106. The in-feed robot 104 can place the cathodes 102 in a staggered manner so that only one in-feed robot 104 may be necessary to supply the conveyor lines 108*a*, 108*b* with the cathodes 102 in alternating fashion, and similarly only one out-feed robot 106 may be necessary to unload the cathodes 102 from the conveyor lines 108*a*, 108*b* in alternating fashion. The conveyor lines 108*a*, 108*b* can be operated independently and intermittently, so that the robots 104, 106 can place and pickup the cathodes 102 from stopped positions.

Spacing of the conveyor lines 108*a*, 108*b* can be determined by space needed for conveyors, spray nozzles, and associated hardware. A walkway can be provided down the center of the washing chamber 110, which can allow for manual maintenance and inspection of the conveyor lines 108*a*, 108*b*, spray nozzles, associated hardware, etc.

In some examples, the washing system 100 can be enclosed. However, enclosing the washing system 100 is optional because, in some environments, it may be possible to wash the cathodes without an enclosure.

As illustrated, in some examples, the washing chamber 110 can include two or more sections or separate chambers, for example, a washing section 110*a* and a rinsing section 110*b*. Optionally, the washing section and rinsing sections 110*a*, 110*b* can be substantially separately enclosed to contain overspray and minimize contamination between the washing section and rinsing sections 110*a*, 110*b*. In the illustrated example, a partitioning wall 112 can substantially separate the washing section and rinsing sections 110*a*, 110*b*. Although one washing section 110*a* and one rinsing section 110*b* are illustrated, a plurality of washing sections and rinsing sections are possible, and optionally each section can be provided with its own enclosure. Furthermore, the washing section 110*a* can include a pre-wash step (described below).

The system 100 can include an exhaust system 114 for exhausting air from within the washing chamber 110. The exhaust system 114 can be configured to maintain the washing chamber 110 at a negative pressure relative to outside ambient air pressure. A negative pressure assists with the retention of water vapor and heat within the system 100.

In some examples, the cathodes 102 can be conveyed by supporting a bottom peripheral edge. Other means are possible for conveying the cathodes 102 through the system 100. For example, the cathodes 102 can be conveyed by an overhead conveyor hook system (not shown), whereby each cathode 102 is held by its hanger bar and allowed to hang freely as it moves through the system 100. However, by supporting a bottom peripheral edge of each cathode 102, the problem of accidental cathode deposit separation from the cathode mother blank, and its possible interference with the conveyor means within the washing chamber 110, can be generally avoided. In some examples, the conveyor 108 can take the form of an endless conveyor belt that is drivable at one end by a drive system 116 to convey each of the cathodes 102 through the washing chamber 110.

Figure 2:
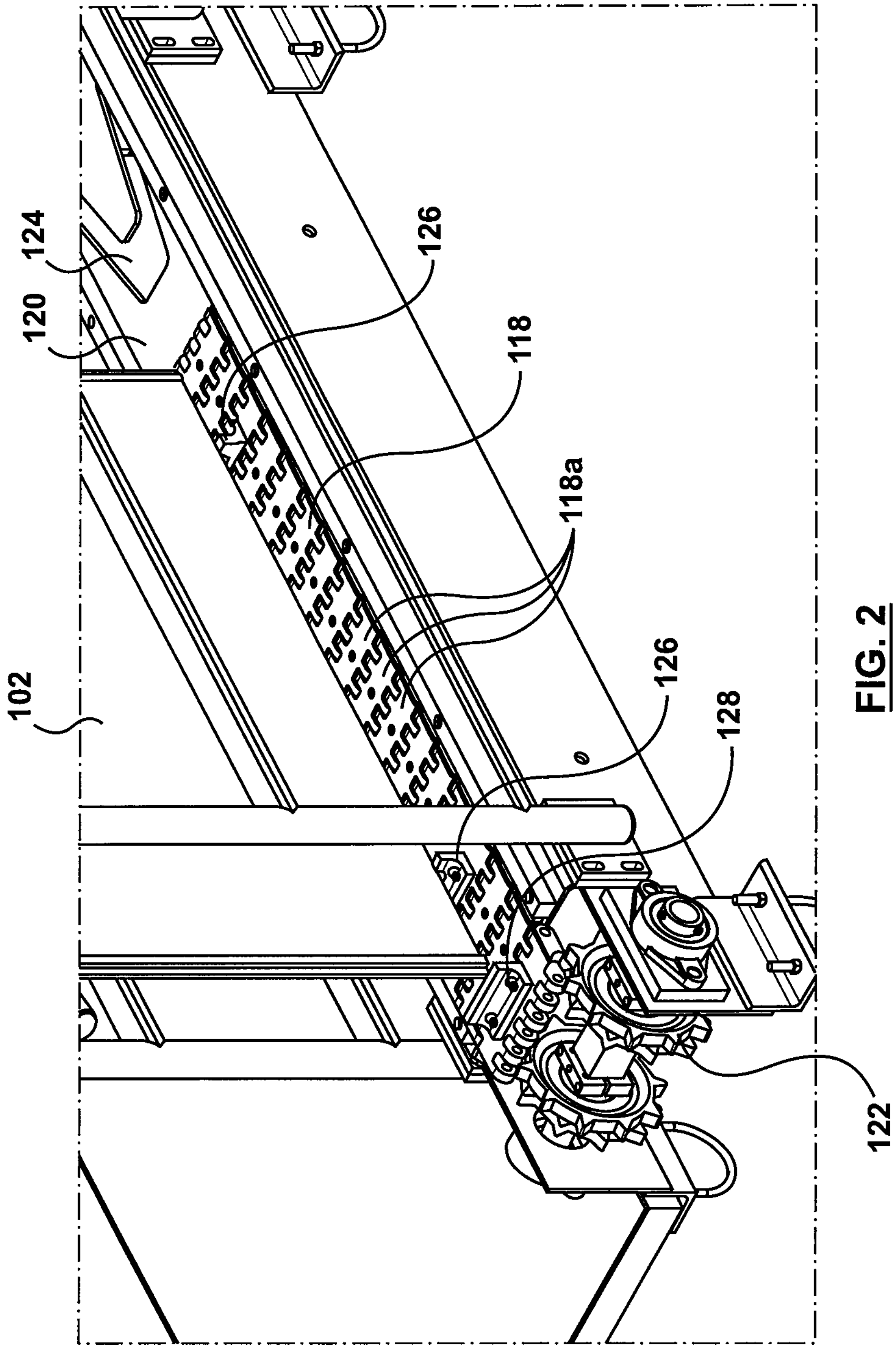
FIGS. 2 to 4 are close-up perspective views of the electrode washing system.

Referring to FIG. 2, the conveyor line 108 can include a conveyor belt 118. The conveyor belt 118 can be formed of a plurality of belt links 118*a*. The belt links 118*a* can be formed from a relatively tough, corrosion and temperature resistant material, such as rigid plastic. The belt links 118*a* can be joined using stainless steel pins between linkages, forming the conveyor belt 118. The belt links 118*a* can surround a slider bed 120 and can be driven by the drive system 116 between spaced apart drive sprockets 122. The conveyor belt 118 can be driven between the drive sprockets 122 to convey the cathodes 102 through the washing chamber 110. The slider bed 120 can be formed of a corrosive resistant material, for example but not limited to, stainless steel. The slider bed 120 can include cutout drain portions 124 allowing for process water to be drained away from the conveyor belt 118.

Cathodes 102 are placed by the in-feed robot 104 onto one or more support cleats 126. The support cleats 126 are secured or fixed along the conveyor belt 118 at spaced apart intervals. The support cleats 126 can be formed of a corrosive resistant material, for example but not limited to, stainless steel. The support cleats 126 can be adapted to maintain the cathodes 102 above the conveyor belt 118 to minimize contact points between the cathodes 102 and the conveyor belt 118 and the support cleats 126, so as to give good washing of bottom edges of the cathodes 102.

Adjacently arranged behind each of the cathodes 102 on the conveyor belt 118 can be a safety stop 128. The safety stop 128 can be secured or fixed along the conveyor belt 118 at spaced apart intervals. The safety stop 128 can be formed of a corrosive resistant material, for example but not limited to, stainless steel. Each of the cathodes 102 can be positioned on the conveyor belt 118 so that the safety stop 128 is immediately behind the cathode 102, but not necessarily touching the cathode 102. The safety stop 128 can serve to engage a rear peripheral edge of the cathode 102 and to urge the cathode 102 along the path if the cathode 102 gets caught while being conveyed along the path, for example, caught on any guide rails (described below).

Figure 3:
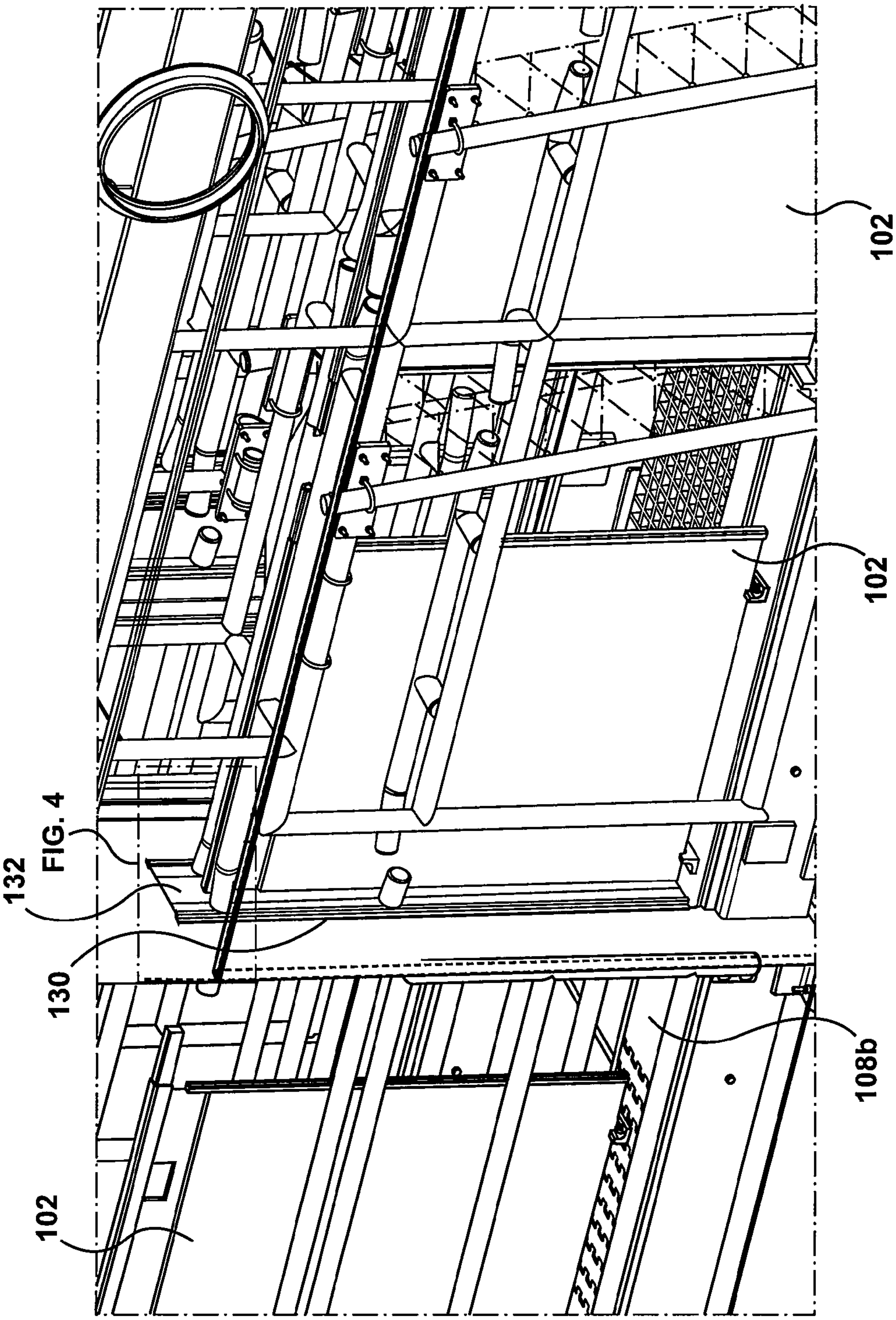
Figure 4:
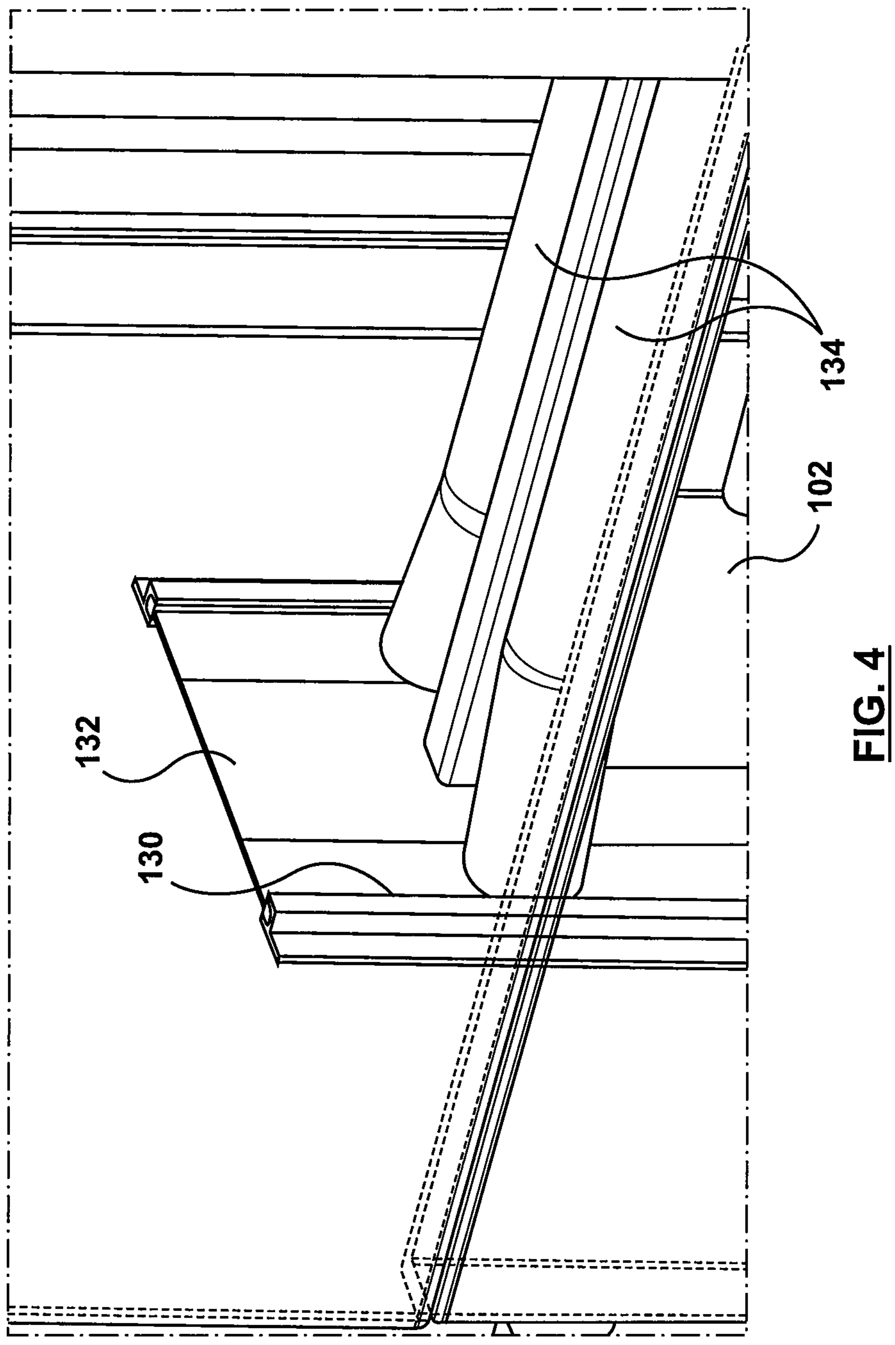
Figure 5:
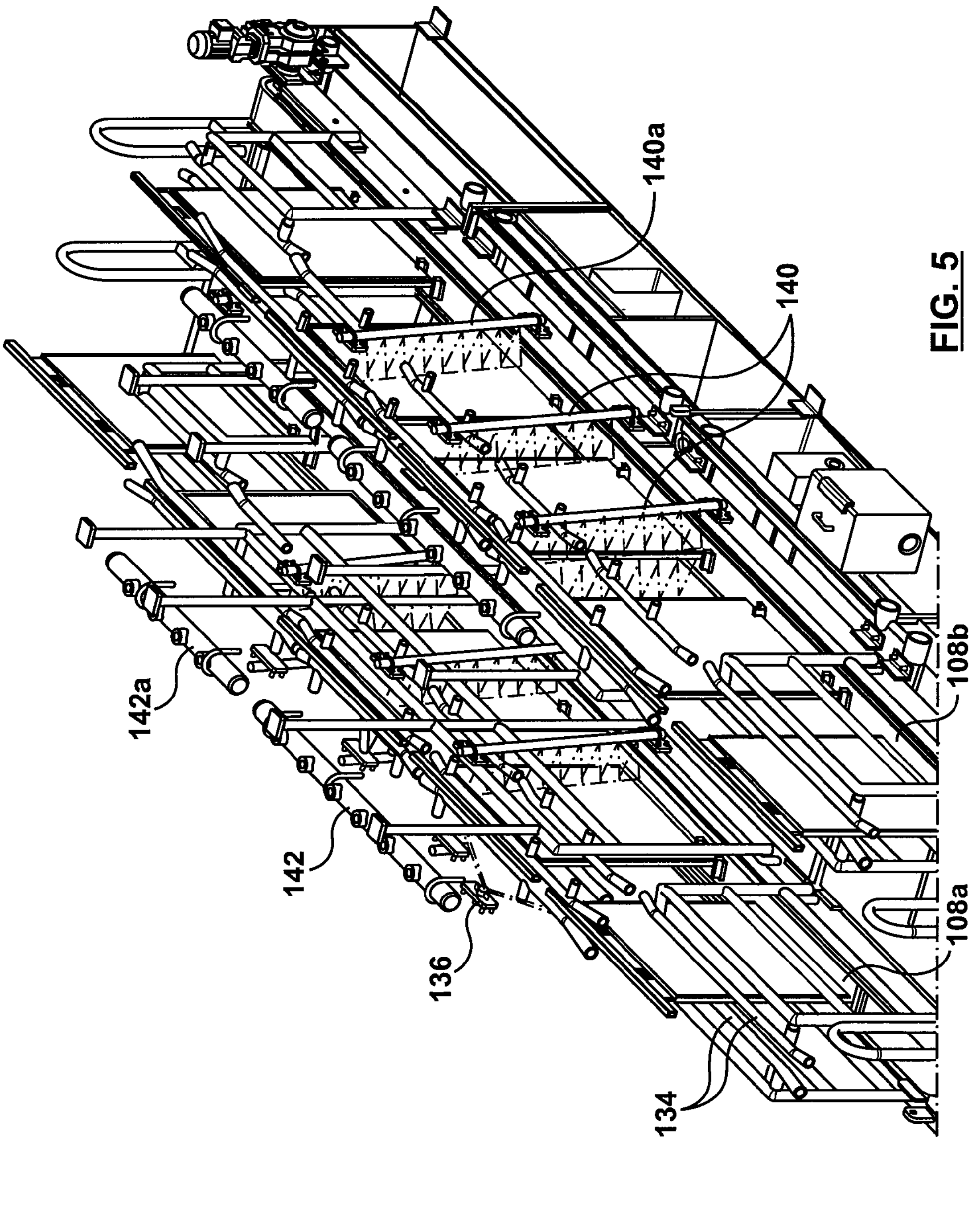
FIG. 5 is a partial perspective view of the electrode washing system.
Figure 6:
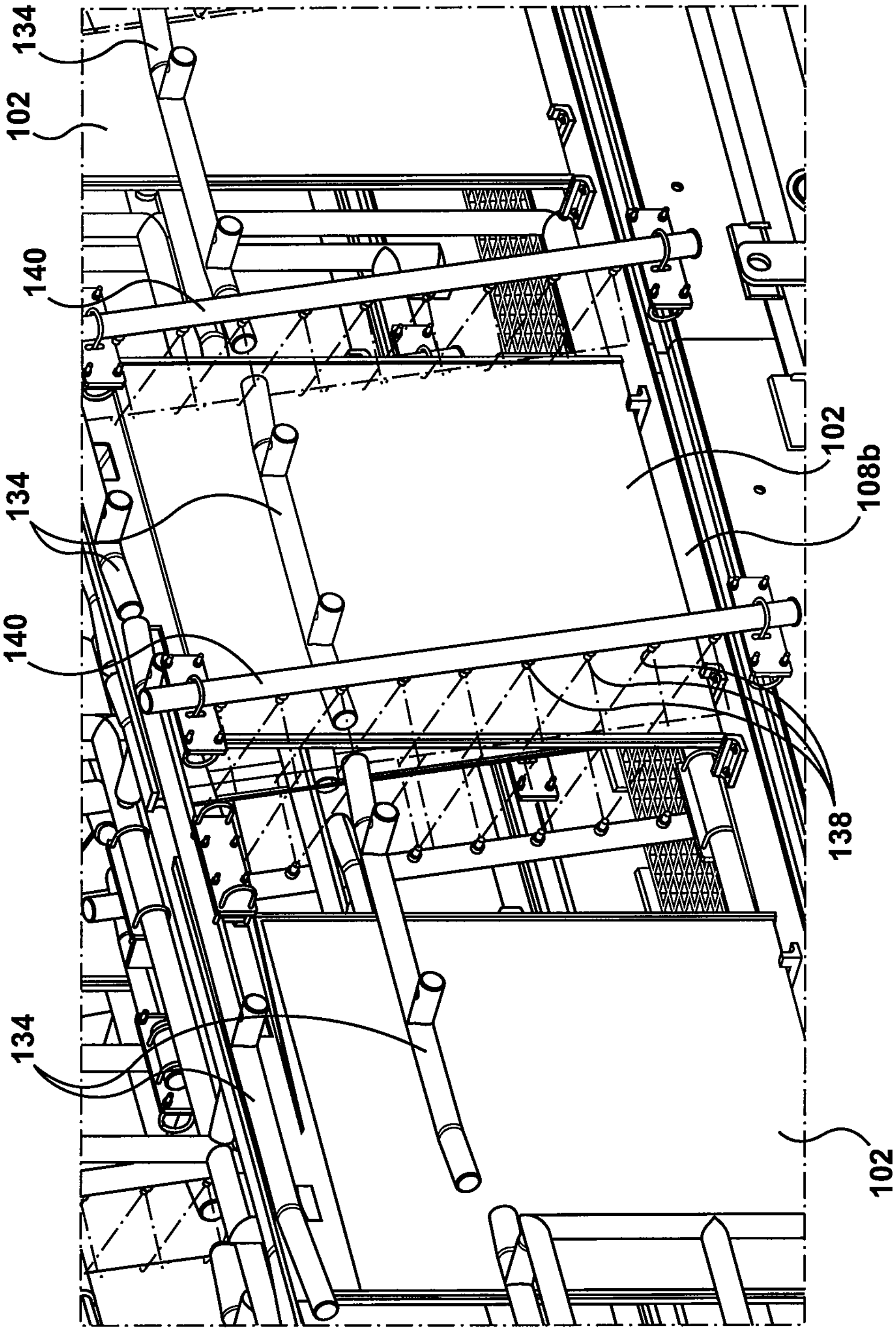
FIG. 6 is a close-up partial perspective view of the electrode washing system.

Referring to FIGS. 3 and 4, an entrance of the washing chamber 110 can be an elongate passage 130. The passage 130 can be sized to allow the cathode 102 to be conveyed edgewise therebetween. The passage 130 can include a sealing mechanism 132 for minimizing airflow around the cathode thereby maintaining the washing chamber 110 roughly sealed relative to the outside ambient air. Maintaining the washing chamber 110 roughly sealed relative to the outside ambient air assists with the retention of heat energy within the system 100 if the washing is carried out at temperatures above an ambient temperature. In some examples, the sealing mechanism 132 can take the form of engaging bristles or opposed rubber flaps.

Similarly, in examples where the washing and rinsing sections 110*a*, 110*b* are substantially separately enclosed by the partitioning wall 112, an elongate passage (not shown) can be provided in the partitioning wall 112 allowing the cathode 102 to pass edgewise from the washing section 110*a* to the rinsing section 110*b*. The elongate passage can also include a sealing mechanism for minimizing airflow around the cathode 102 thereby reducing mixing of wash and rinse spray water.

Referring to FIGS. 5 to 9, the enclosure defining the washing chamber 110 has been removed to show the system 100 in greater detail. A plurality of guide rails 134 can be arranged laterally on either side of the path, for maintaining the cathodes 102 generally vertically as the cathodes 102 are conveyed along the path. Internal components, such as the guide rails 134, can be formed of corrosion resistant materials, for example, plastics or stainless steel, in order to withstand the relatively corrosive environment within the washing chamber 110.

Optionally, the cathode 102 can be pre-washed with relatively low pressure water immediately once the cathode 102 has entered the washing chamber 110 through the passage 130. In a pre-wash step, the cathode 102 can be sprayed with water from at least one pre-wash nozzle 136 adjacent to the entrance to the washing chamber 110. In some examples, each of the pre-wash nozzles 136 can be generally fan shaped, for example, with a spray angle of 135 degrees. Each of the pre-wash nozzles 136 can direct water horizontally across each of the cathodes 102 as the cathodes 102 are conveyed along the path.

In one aspect, the pre-wash spray wets the surface of the cathode 102 to begin dissolution of the surface impurities prior to washing. As the cathodes 102 enter the washing chamber 110, they can be relatively cool since they are coming from an ambient environment. For example, cathodes 102 being introduced to the system 100 by the in-feed robot 106 can be approximately 0 to 20 degrees Celsius. In another aspect, the pre-wash spray can be used to bring the cathode 102 up to a higher temperature. It can be beneficial for the subsequent washing for the cathodes to be at an elevated temperature, for example, approximately 60 to 80 degrees Celsius, so that surface impurities can be sufficiently dissolved and stripped away during washing.

A plurality of wash nozzles 138 are provided adjacent to the path at opposing sides thereof. The wash nozzles 138 are configured to direct a wash spray to impinge at the sides of each of the cathodes 102 as the cathodes 102 are conveyed along the path. Conveying each of the cathodes 101 edgewise enables each wash nozzles 138 to be directed generally perpendicularly to the surface of the each cathode 102, and at a sufficiently close distance, allowing substantially the entire surface of the respective side of the cathode 102 to be subjected to direct impingement effective to clear impurities or contaminants from the surface of the cathode 102. The wash nozzles 138 can be maintained roughly equidistant from the cathode 102 to ensure uniform washing, and there can be a generally mirror image of the wash nozzles 138 on both sides of the cathodes 102.

In some examples, the wash nozzles 138 can be positioned relative to the cathode 102 such that, when each cathode 102 passes by the wash nozzles 138, the wash spray of each wash nozzle 138 overlaps the spray of an adjacent wash nozzles 138 so that wash spray pattern covers an entire vertical strip across one side of the cathode 102. Thus, as one of the cathodes 102 moves horizontally past the wash nozzles 138, the entire side surface of the cathode 102 will be washed. Alternatively, moving wash nozzles can be provided to direct wash spray substantially vertically across one entire side of the cathode 102.

Two or more of the plurality of wash nozzles 138 can be arranged linearly to form a nozzle array 140. The wash nozzles 138 can be arranged in the nozzle array 140 so that the wash spray of each wash nozzle 138 overlaps the spray of an adjacent wash nozzles 138, such that wash spray can be directed substantially vertically across the entire side of the cathode 102 as the cathode 102 is conveyed along the path.

As illustrated, the nozzle arrays 140 can be angled in a direction opposing the direction A, such that the wash spray impinges an upper portion of the first side prior to a bottom portion of the first side as the cathode is conveyed along the path. Angling the nozzle arrays 140 in a direction opposing the direction A provides a "squeegee" effect, in that spray from the nozzle array 140 serves to wipe down the surface of the cathode 102 surface as the cathode 102 passes by edgewise. Furthermore, to provide a compound angle, each of the wash nozzles 138 can also be angled slightly backward in a direction opposing the direction A to ensure full impingement of the surface of the cathode 102 when the cathode 102 is in motion. The particular angle can be adjusted, and optimized to the speed at which the cathodes 102 are conveyed through the wash chamber. The compound angle ensures that there is full impingement of the surface of the cathode 102.

As illustrated, a plurality of nozzle arrays 140 can be provided in series within the washing section 110*a*. Water distribution can be provided to the nozzle arrays 140 by headers 142 positioned generally above the path of the cathodes 102. The headers 142 can include pigtails to provide a water supply to each wash nozzle 138 through the respective nozzle array 140. Each of the wash nozzles 138 can spray, for example but not limited to, 60 pounds per square inch of water pressure. In an example, the water flow rate to the wash nozzles 138 can be maintained at roughly 200 liters per minute per cathode, with a retention time of approximately 2 minutes, although various different flow rates, retention times and pressures are possible.

Within the optional rinsing section 110*b*, one or more rinse nozzle arrays 140*a* can be provided. Water distribution can be provided to the nozzle arrays 140*a* by headers 142*a* positioned generally above the path of the cathodes 102 in the rinsing section 110*b*.

In some examples, water provided to the rinse nozzle arrays 140*a* can be purified water, for example, deionized water. Water provided to the rinse nozzle arrays 140*a* can also be heated. Waste rinse water can be collected from below the cathodes 102 around the rinse nozzle arrays 140*a*, and at least a portion of the waster rinse water can be provided to continuously dilute and to effect the partial replenishment of the wash water supplied to the wash nozzle arrays 140.

Figure 10:
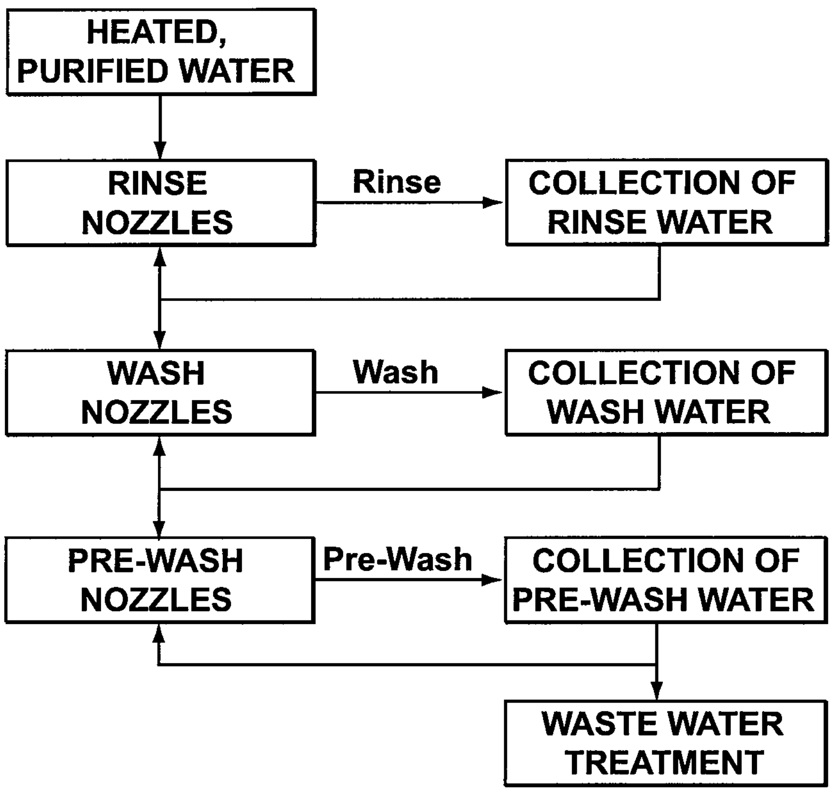
FIG. 10 is a flow chart.
Figure 11:
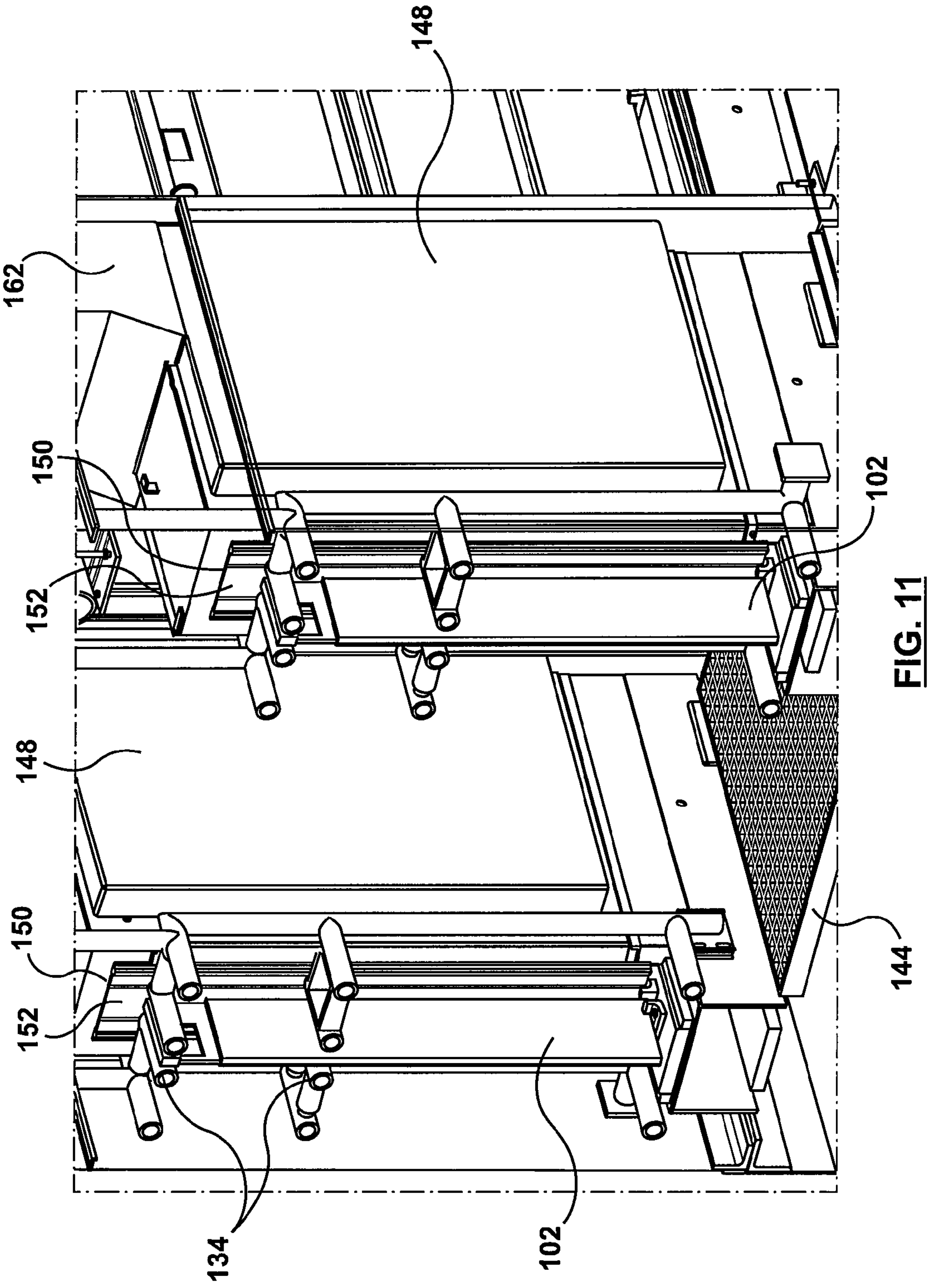
FIG. 11 is a close-up partial perspective view of the electrode washing system.
Figure 12:
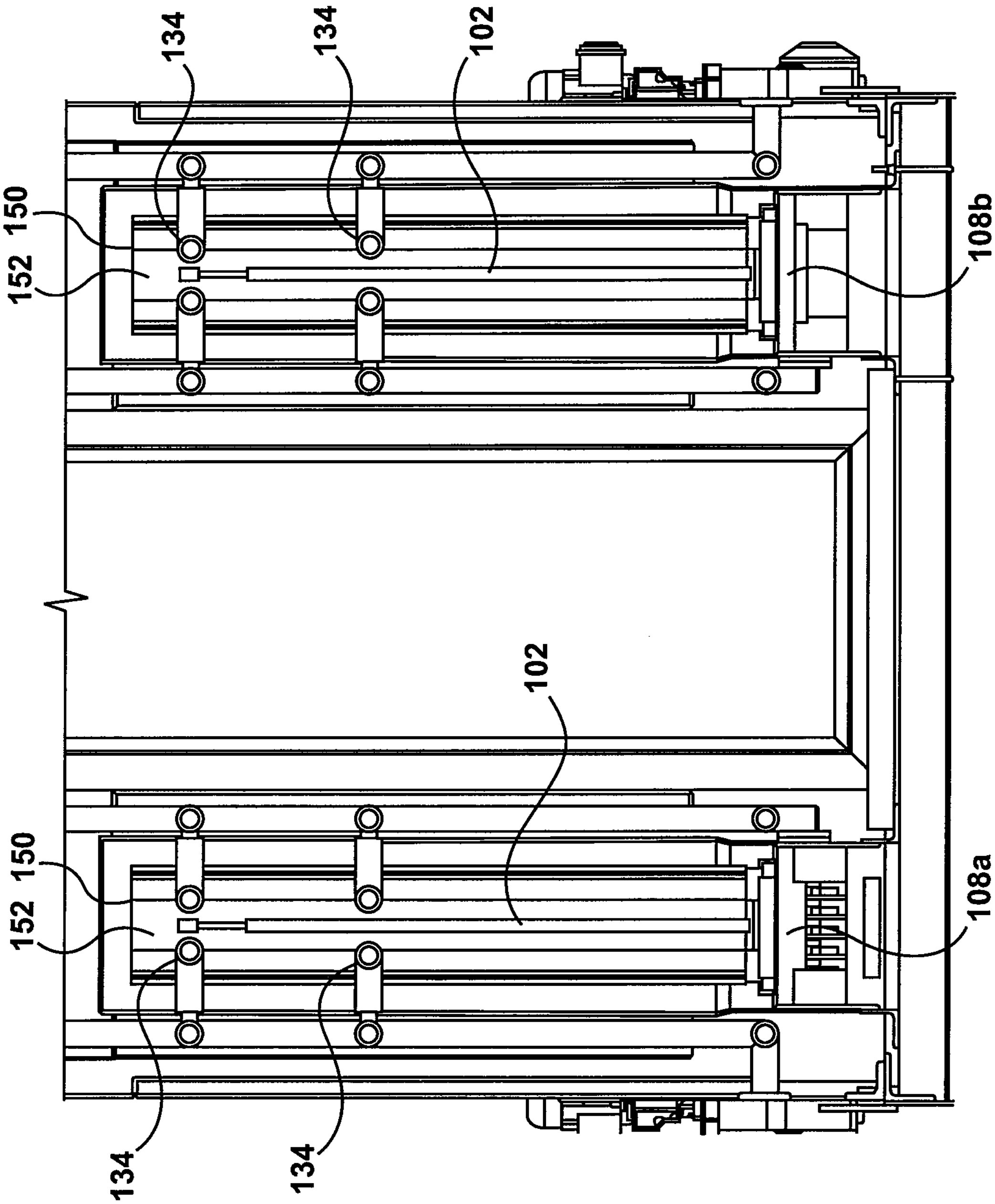
FIG. 12 is a close-up partial end view of the electrode washing system.
Figure 13:
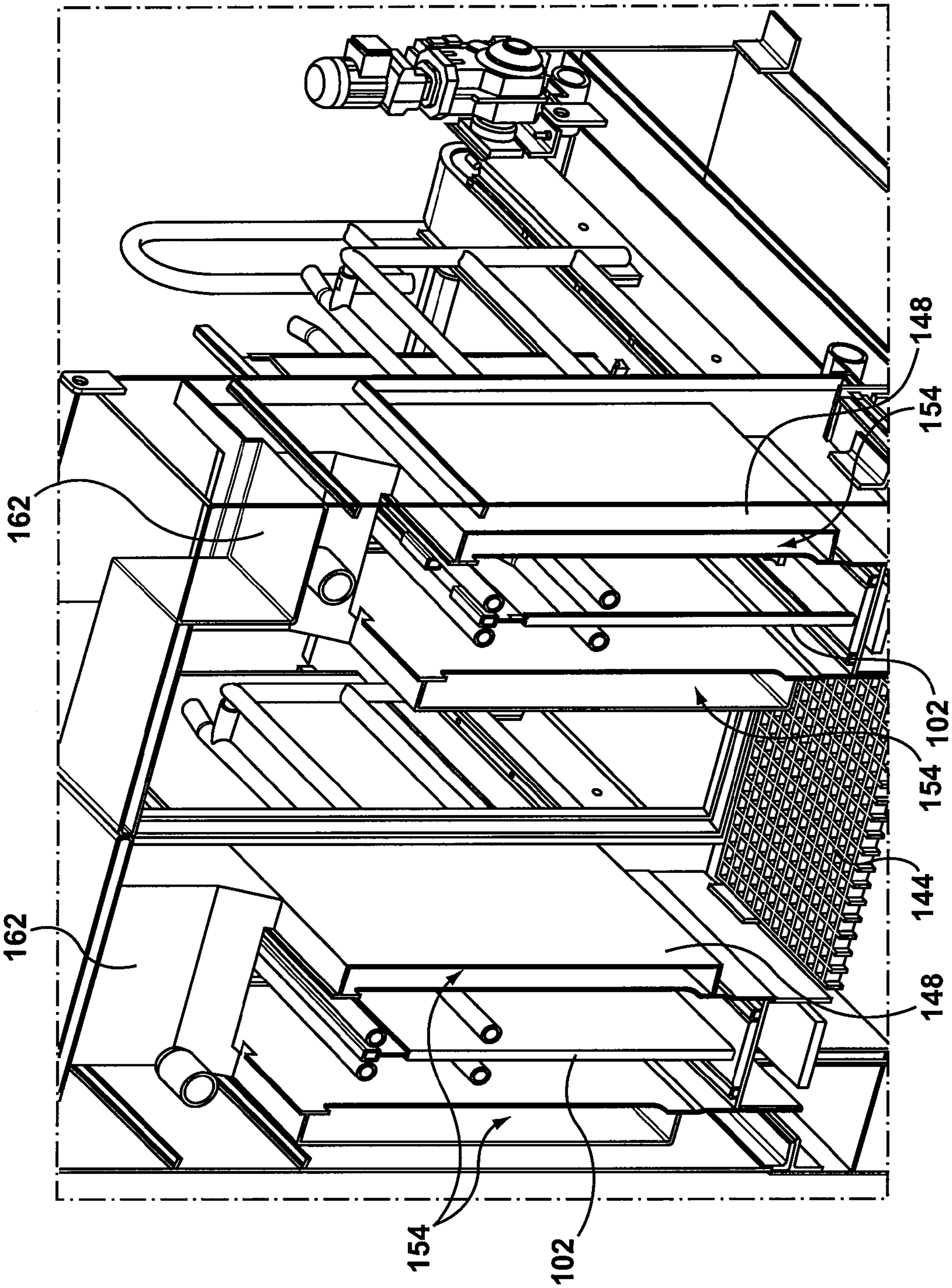
FIG. 13 is a close-up partial perspective view of the electrode washing system.
Figure 14:
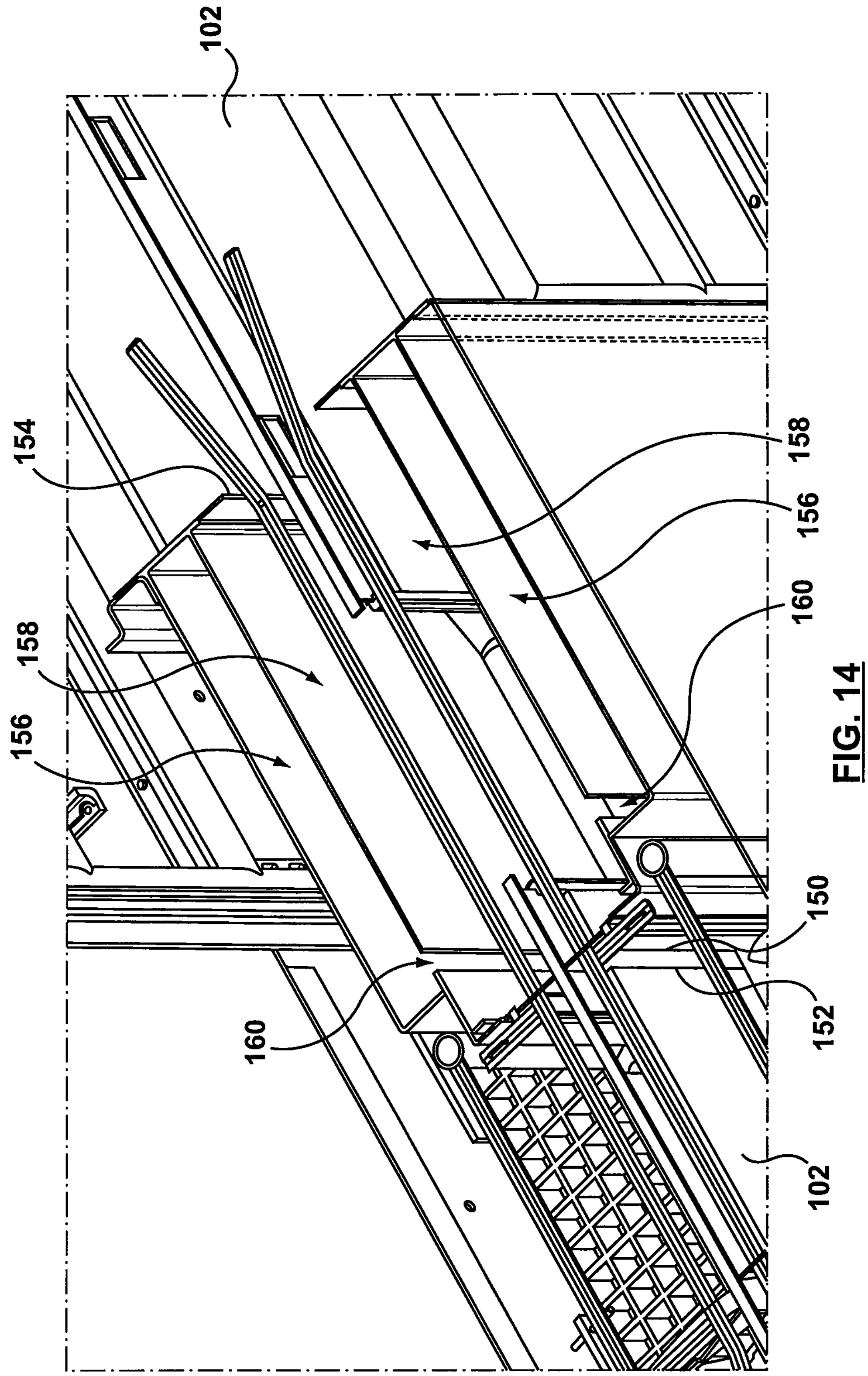
FIG. 14 is a close-up partial perspective view of the electrode washing system.

There can be continuous circulation and at least partial reuse of the pre-wash, wash and rinse water, and simultaneous partial replenishment of the sources of the pre-wash, wash and rinse water, so that water can be conserved and desired levels of water purity can be maintained in the different sections of the system 100. FIG. 10 is a flow chart showing the possible water distribution paths within the system 100. Maintaining a single flow distribution network of the water assists with the conservation of heat energy within the system 100, minimizing the amount of energy required to maintain the interior of the chamber 110 at a desired elevated temperature.

In some examples, waste rinse water can be collected and at least a portion of the waste rinse water can be directed to supply to the wash nozzle arrays 140. Optionally, another portion of the waste rinse water can be directed to supply the rinse nozzle arrays 140*a* and mixed with fresh rinse water. However, in order to maintain a relatively pure flow of rinse water, it may not be desirable to recycle rinse water for rinsing purposes.

Similarly, in some examples, a portion of waste wash water collected from below the cathodes 102 around the wash nozzle arrays 140 can be collected and directed to feed the wash nozzles 140, and optionally mixed with the waste rinse water. Another portion of the waste wash water can be continuously removed and disposed of in accordance with known waste water treatment methods. Yet another portion of the collected waste wash water can be directed to feed the prewash nozzles 136.

In some examples, waste pre-wash water can be collected from below the cathodes 102 around the pre-wash nozzles 136. A portion of waste pre-wash water can be directed back to feed the pre-wash nozzles 136. Another portion of the waste pre-wash water can be continuously removed and disposed of in accordance with known waste water treatment methods.

Figure 9:
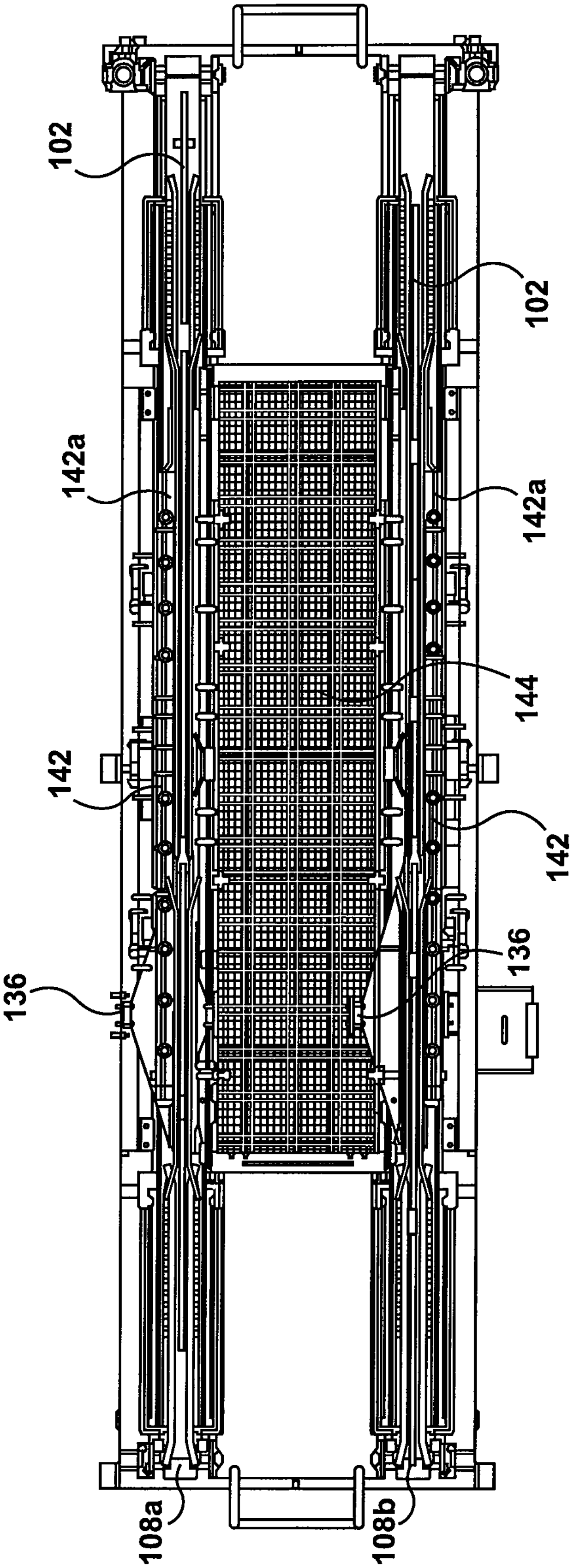
FIG. 9 is a partial top view of the electrode washing system.

Referring to FIG. 9, a grating 144 or another suitable open surface can be provided between the conveyors 108*a*, 108*b* to facilitate maintenance and cleaning. One or more reservoirs 146 can be provided underneath the grating 144 to collect the used waste water from the pre-wash, wash and rinse steps. The wash reservoir 146 collects waste wash water that has impinged the cathode 102 and descended through the grating 144. The waste wash water can either be disposed of according to known waste water treatment techniques, or recycled by returning it to the wash nozzles 138.

Figure 7:
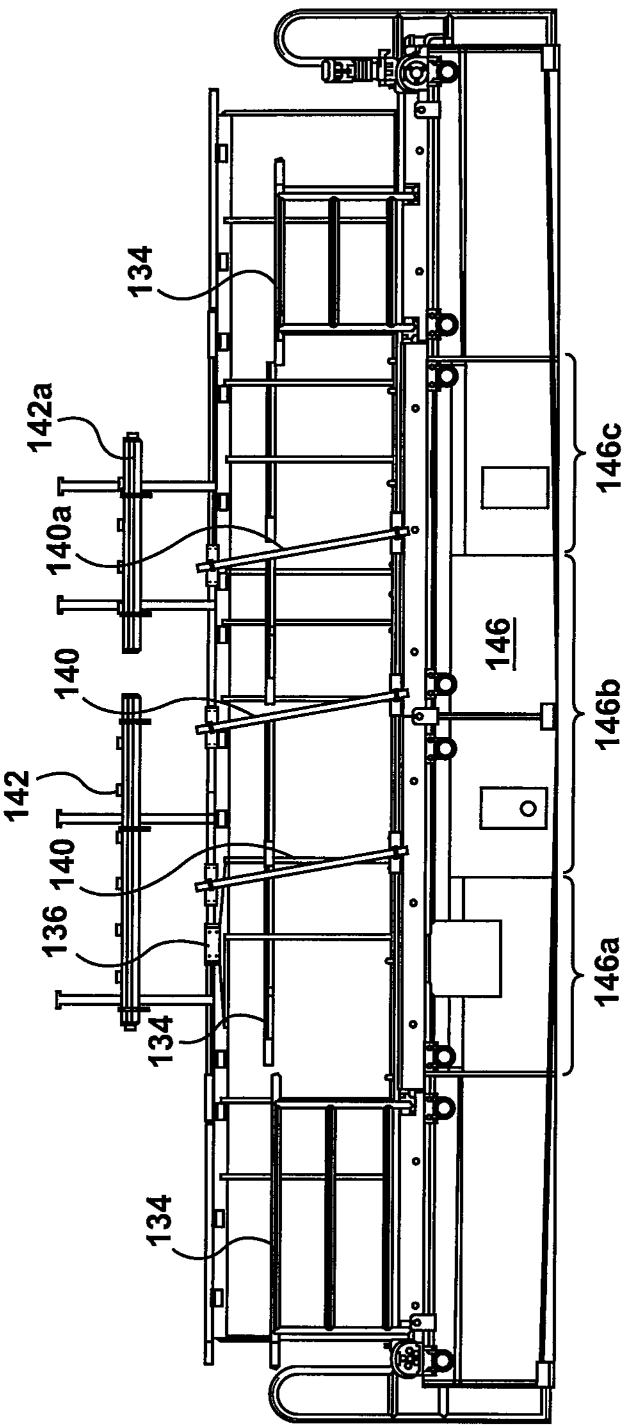
FIG. 7 is a partial side view of the electrode washing system.
Figure 8:
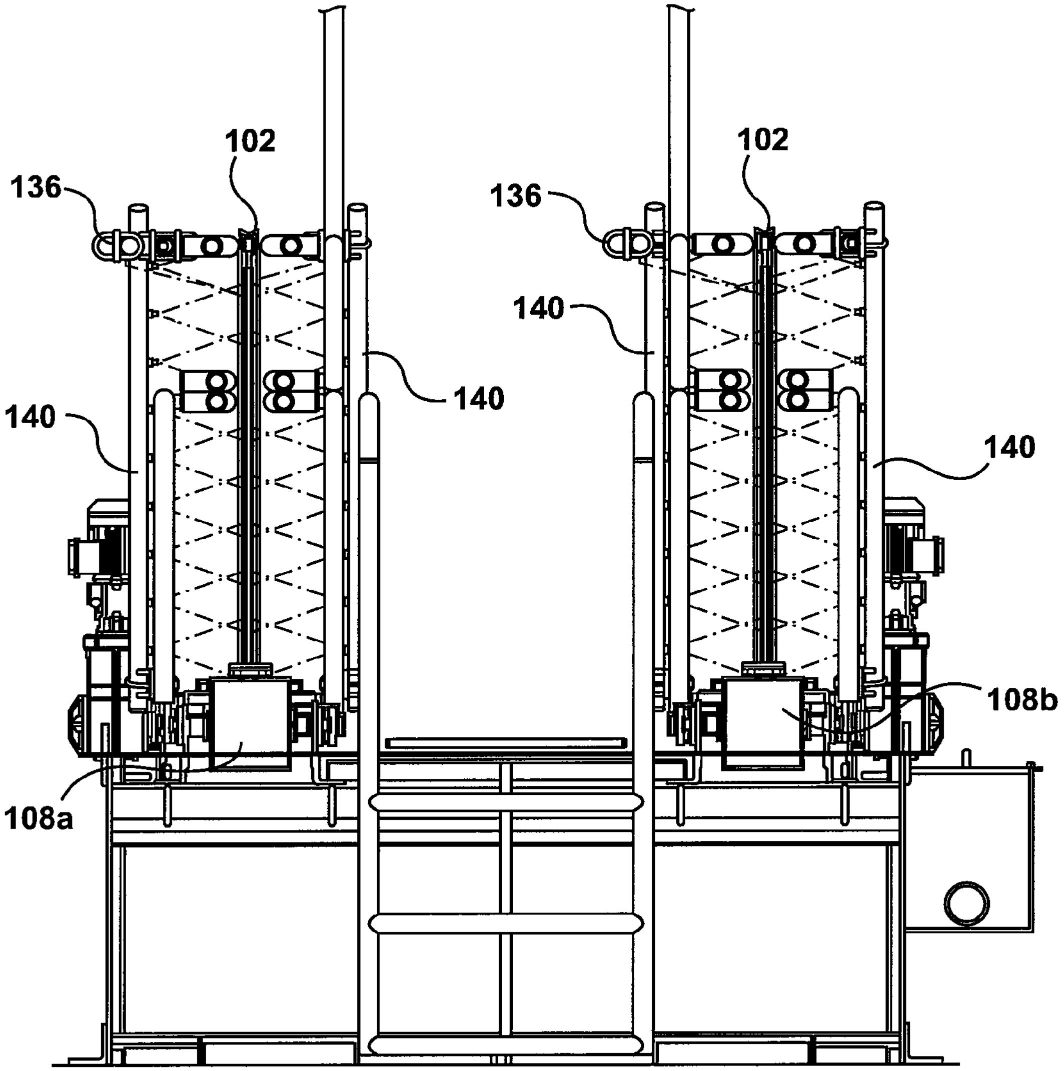
FIG. 8 is a partial end view of the electrode washing system.

In the example illustrated, referring particularly to FIG. 7, the reservoir 146 can include a pre-wash section 146*a* located directly below the pre-wash nozzles 136, a wash section 146*b* located below the wash nozzle arrays 140, and a rinse section 146*c* located directly below the rinse nozzle arrays 140*a*. The reservoir 146 can includes a series of dividers or baffles (not shown) separating each of the sections 146*a*, 146*b*, 146*c*. In each of the sections 146*a*, 146*b*, 146*c*, process water can be captured by the tank and the baffles can provide an underflow between each of the sections 146*a*, 146*b*, 146*c* to distribute the water between each of the sections 146*a*, 146*b*, 146*c*. In some examples, the purified water provided to the rinse nozzle arrays 140*a* can be heated water. Accordingly, a temperature gradient can be present across the reservoir 146, whereas water in the rinse section 146*c* is generally a higher temperature than water in the pre-wash section 146*a*. To conserve water usage and to provide a flow balance, the flow of water provided to the rinse nozzle arrays 140*a* can be roughly matched with the flow of the pre-wash nozzles 136, so that all water used during the rinsing of the cathodes 102 can be subsequently utilized downstream (upstream relative to the movement of the cathodes 102) during the pre-washing step. The flow of water at each of the sections 146*a*, 146*b*, 146*c* can be monitored to ensure that a flow balance is roughly maintained. Furthermore, flow rate of the purified input water provided for the rinsing nozzle arrays 140*a* can be roughly matched against the flow rate of the waste water treatment for process water exiting the pre-wash reservoir 146*a*.

The one or more pre-wash nozzles 136 can be connected to a source of heated water so that the cathodes 102 can be increased to a desirable temperature upon entering the wash chamber 110. Alternatively, in some examples, a separate heating source is not required, since the purified water provided to the rinse nozzle arrays 140*a* can be heated water and, as described above, the one or more pre-wash nozzles 136 can be fed with water that has been collected and recycled from the downstream wash and optional rinse steps. The pre-wash water can therefore already be sufficiently warm to increase the temperature of the cathodes 102.

Referring to FIGS. 11 to 14, a drying system 148 can be provided at the exit of the wash chamber 110. An entrance of the drying system 148 can be an elongate passage 150. The passage 150 can be similar to passage 130, sized to allow the cathode 102 to be conveyed edgewise therebetween. The passage 150 can also include a sealing mechanism 152 for minimizing airflow around the cathode thereby maintaining the washing chamber 110 roughly sealed relative to the drying system 148. For example, the sealing mechanism 152 can take the form of engaging bristles or opposed rubber flaps. An exit of the drying system 148 can be an elongate passage 154.

The drying system 148 is adapted to provide a rush of air surrounding both sides of the cathode 102 as the cathode 102 is exiting the washing chamber 110 to substantially dry the surfaces of the cathode 102. The drying system 148 takes advantage of the relatively high temperature of the cathode 102 after the rinsing step. For example, the cathode surface can be between 60 and 80 degrees Celsius after the rinsing step.

The drying system 148 can include a pair of plenums 156 extending generally vertically on opposing sides of the path of the cathode 102. The negative pressure of the washing chamber 110 relative to outside ambient pressure causes external air to enter the passage 154 and flow alongside a gap 158 provided on either side of the cathode 102. The air flows alongside of the gap 158, and is drawn into vertically extending longitudinal slots 160 provided adjacent to the passage 150. The slots 160 feed the air into a respective one of the plenums 156. The plenums 156 are connected to exhaust ducts 160. The exhaust ducts 160 can independently vent the air used to dry the cathodes 102, or the exhaust ducts 160 can be connected to the exhaust system 114 so that the air used to dry the cathodes 102 is vented with other air from inside the washing chamber 110.

Figure 15:
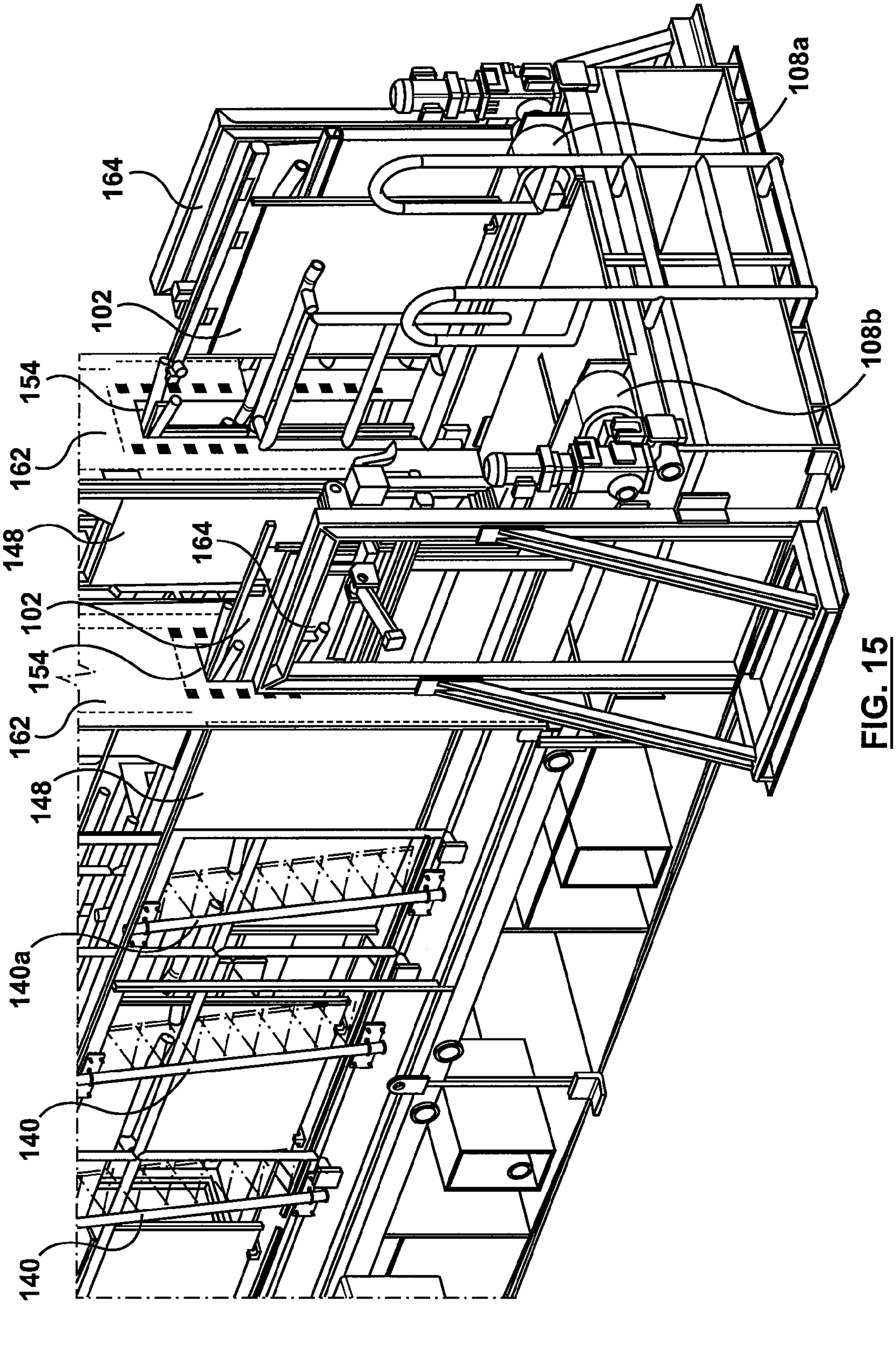
FIG. 15 is a close-up reverse perspective view of the electrode washing system.

Referring to FIG. 15, when the cathode 102 emerges from the passage 154, a weight/alignment mechanism 164 can be triggered to pick up each of the cathodes and present the cathodes for conveyance by the out-feed robot 106 (not shown in FIG. 15). In some examples, the mechanism 164 can include a piston controlling two horizontally spaced arms. The arms are adapted to engage the hanger bar of each of the cathodes 102 to one of the cathodes, and accurately position the cathode 102 to be picked up by the out-feed robot 106. Optionally, the mechanism 164 can include a load cell for weighing the cathode 102. In examples where the cathode 102 is a permanent cathode, the weight generated by the mechanism 164 can be used to calculate an approximate harvest copper weight. Furthermore, the mechanism 164 can be coupled with a computer to enable "smart strip" capability. Smart strip refers to the use of weight information to determine the flexing required during a subsequent stripping operation to strip away the copper deposit from the permanent cathode blank. Subsequent cathode processing steps such as stripping, stacking, strapping, weighing and marking can be provided in separate downstream operations.

Although the electrode washing method and system disclosed herein refers particularly to the washing of a cathode product produced on permanent cathodes, the method and system disclosed herein could be used to wash cathodes produced on starter sheets. The method and system disclosed herein could also be used to wash spent anodes. Furthermore, the method and system disclosed herein could be used to wash un-plated permanent cathode sheet blanks (i.e. after a stripping operation but prior to another plating operation), to remove any residual deposited materials. In such examples, the method and system can include nozzles configured to generate high pressure wash spray, e.g., of 40,000 psi (2,760 bar).

Although particular embodiments of one or more inventions have been described in detail herein with reference to the accompanying drawings, it is to be understood that each claimed invention is not limited to those particular embodiments, and that various changes and modifications may be effected therein by one skilled in the art without departing from the scope or spirit of any invention as defined in the appended claims.

We claim:

1. A method of washing a permanent cathode assembly, the permanent cathode assembly including first and second sides and a bottom peripheral edge, the method comprising:

substantially enclosing a washing section, and maintaining the washing section at a negative pressure relative to an ambient pressure;

providing a plurality of wash nozzles adjacent to a path in the washing section at opposing sides thereof;

conveying the permanent cathode assembly edgewise along the path in the washing section by supporting the bottom peripheral edge;

directing wash sprays from the nozzles to impinge the first and second sides;

subjecting the permanent cathode assembly to an airflow to dry the permanent cathode assembly, the airflow being formed at least in part of external air entering the washing section due to the negative pressure;

drawing the air used to dry the permanent cathode assembly from around the first and second sides into at least one exhaust duct; and delivering the air from the at least one exhaust duct into the washing section so as to retain moisture and heat energy within the washing section.

2. The method of claim 1, further comprising guiding the permanent cathode assembly as the permanent cathode assembly is conveyed along the path so as to maintain the permanent cathode assembly generally vertically.

3. The method of claim 2, wherein the wash spray is directed generally perpendicularly to the path.

4. The method of claim 3, wherein two or more of the plurality of wash nozzles direct the wash spray substantially vertically across the first side, and the wash spray impinges an upper portion of the first side prior to a bottom portion of the first side as the permanent cathode assembly is conveyed along the path.

5. The method of claim 1, further comprising providing a mechanism for substantially sealing an entrance and exit at which the permanent cathode assembly is allowed to pass edgewise respectively into and out of the washing section.

6. The method of claim 1, further comprising:

providing at least one rinse nozzle adjacent to the path downstream from the wash nozzles; and directing a rinse spray from the at least one rinse nozzle to rinse the permanent cathode assembly as the permanent cathode assembly is conveyed along the path.

7. The method of claim 6, further comprising substantially separately enclosing a rinsing section associated with the rinse spray.

8. The method of claim 7, further comprising maintaining the rinsing section at a negative pressure relative to an ambient pressure.

9. The method of claim 6, further comprising:

collecting waste rinse water from below the at least one rinse nozzle; and providing at least a portion of the waste rinse water to the wash nozzles for the wash spray.

10. The method of claim 6, further comprising:

providing at least one pre-wash nozzle adjacent to the path upstream from the wash nozzles, the pre-wash nozzle connected to a source of heated water; and directing a pre-wash spray from the at least one pre-wash nozzle onto the permanent cathode assembly to wet the permanent cathode assembly and increase the permanent cathode assembly's temperature above an ambient temperature prior to washing.

11. The method of claim 10, further comprising:

collecting waste water from below the wash nozzles; and providing at least a portion of the waste water to the at least one pre-wash nozzle for the pre-wash spray.

12. The method of claim 1, wherein the step of subjecting comprises providing a rush of air generally surrounding the first and second sides to substantially dry the first and second sides.

* * * * *